(12) United States Patent
Campbell

(10) Patent No.: US 10,857,477 B1
(45) Date of Patent: Dec. 8, 2020

(54) FERRIS WHEEL SOUVENIR

(71) Applicant: Dallas Campbell, Decatur, GA (US)

(72) Inventor: Dallas Campbell, Decatur, GA (US)

(*) Notice: Subject to any disclaimer, the term of this patent is extended or adjusted under 35 U.S.C. 154(b) by 0 days.

(21) Appl. No.: 16/684,579

(22) Filed: Nov. 14, 2019

(51) Int. Cl.
| | |
|---|---|
| *A63H 33/00* | (2006.01) |
| *A63H 33/42* | (2006.01) |
| *H04R 1/02* | (2006.01) |
| *G05B 15/02* | (2006.01) |
| *G06F 3/16* | (2006.01) |
| *G09F 13/22* | (2006.01) |
| *G06F 3/02* | (2006.01) |
| *H05B 45/00* | (2020.01) |

(52) U.S. Cl.
CPC ............ *A63H 33/42* (2013.01); *G05B 15/02* (2013.01); *G06F 3/165* (2013.01); *H04R 1/025* (2013.01); *H04R 1/028* (2013.01); *G06F 3/0202* (2013.01); *H05B 45/00* (2020.01)

(58) Field of Classification Search
CPC ........ A63H 33/00; A63H 33/02; A63H 33/22; A63H 33/26; A63H 33/42; A63H 3/00; A63H 3/006; A63H 3/28; A63H 5/00; A63H 17/28; A63H 30/02; G09F 13/22; G09F 27/00; G09F 19/00

USPC ..... 446/175, 78, 219, 227, 485, 491; 40/414
See application file for complete search history.

(56) References Cited

U.S. PATENT DOCUMENTS

| | | |
|---|---|---|
| D211,035 S | 5/1968 | Spengler |
| 3,471,143 A * | 10/1969 | Lakin .................... A63H 13/20 472/7 |
| 3,983,647 A | 10/1976 | Stubbmann |
| 4,476,649 A | 10/1984 | Zaruba |
| D285,592 S | 9/1986 | Kushner |
| 5,387,146 A | 2/1995 | Smith et al. |
| D379,777 S | 6/1997 | Segan et al. |
| 6,086,448 A * | 7/2000 | Ibanez .................... G09F 17/00 40/218 |
| 6,557,491 B1 * | 5/2003 | Weiser .................. A01G 9/022 119/57.8 |
| D572,317 S | 7/2008 | Lam |
| 9,873,280 B1 | 1/2018 | Nelson et al. |
| 2004/0144005 A1 * | 7/2004 | Young .................... G09F 19/08 40/414 |

* cited by examiner

*Primary Examiner* — Kien T Nguyen

(57) ABSTRACT

An illustrated view of an exemplary souvenir for displaying high-lights or historical information to others is presented. The souvenir is useful for providing a fun, exciting and cheery presence to a room or house by recalling and reminiscing about a wonderful experience. Also, the souvenir is useful providing and sharing the world, an abbreviated history of great cities such as Atlanta, New York City, New Orleans, Chicago, etc. The souvenir is the shape of a Ferris wheel.

14 Claims, 2 Drawing Sheets

FERRIS WHEEL SOUVENIR

FIELD OF THE INVENTION

This invention relates to souvenirs. More particularly, it relates to a Ferris wheel souvenir for remembering and reminiscing.

BACKGROUND

A souvenir (from French, for a remembrance or memory), memento, keepsake, or token of remembrance is an object a person acquires for the memories the owner associates with it. A souvenir can be any object that can be collected or purchased and transported home by the traveler as a memento of a visit. While there is no set minimum or maximum cost that one is required to adhere to when purchasing a souvenir, etiquette would suggest to keep it within a monetary amount that the receiver would not feel uncomfortable with when presented the souvenir. The object itself may have intrinsic value, or be a symbol of experience. Without the owner's input, the symbolic meaning is invisible and cannot be articulated.

The tourism industry designates tourism souvenirs as commemorative merchandise associated with a location, often including geographic information and usually produced in a manner that promotes souvenir collecting.

Throughout the world, the souvenir trade is an important part of the tourism industry serving a dual role, first to help improve the local economy, and second to allow visitors to take with them a memento of their visit, ultimately to encourage an opportunity for a return visit, or to promote the locale to other tourists as a form of word-of-mouth marketing. Perhaps the most collected souvenirs by tourists are photographs as a medium to document specific events and places for future reference.

Souvenirs also include non-mass-produced items like folk art, local artisan handicrafts, objects that represent the traditions and culture of the area, non-commercial, natural objects like sand from a beach, and anything else that a person attaches nostalgic value to and collects among his personal belongings.

Similar to souvenirs, memorabilia are objects treasured for their memories or historical interest; however, unlike souvenirs, memorabilia can be valued for a connection to an event or a particular professional field, company or brand.

Examples include sporting events, historical events, culture, and entertainment. Such items include: clothing; game equipment; publicity photographs and posters; magic memorabilia; other entertainment-related merchandise & memorabilia; movie memorabilia; airline and other transportation-related memorabilia; and pins, among others.

When people travel or move away from a long-time home, they often wish to take souvenirs that can express the key items and music associated with their home. Further, people wish to excite others by having a souvenir that has motion to bring the attention of others to the high-lights of their desired location. Currently, no souvenir has all of these items collapsed into a souvenir that can show others the high-lights of their desired location or events.

In light of the foregoing, it would be desirable to devise a souvenir that not only displays high-lights of a desired location, but further plays music related to the desired location and has lights which can draw attention from others.

DETAILED DESCRIPTION

Figure 1A:
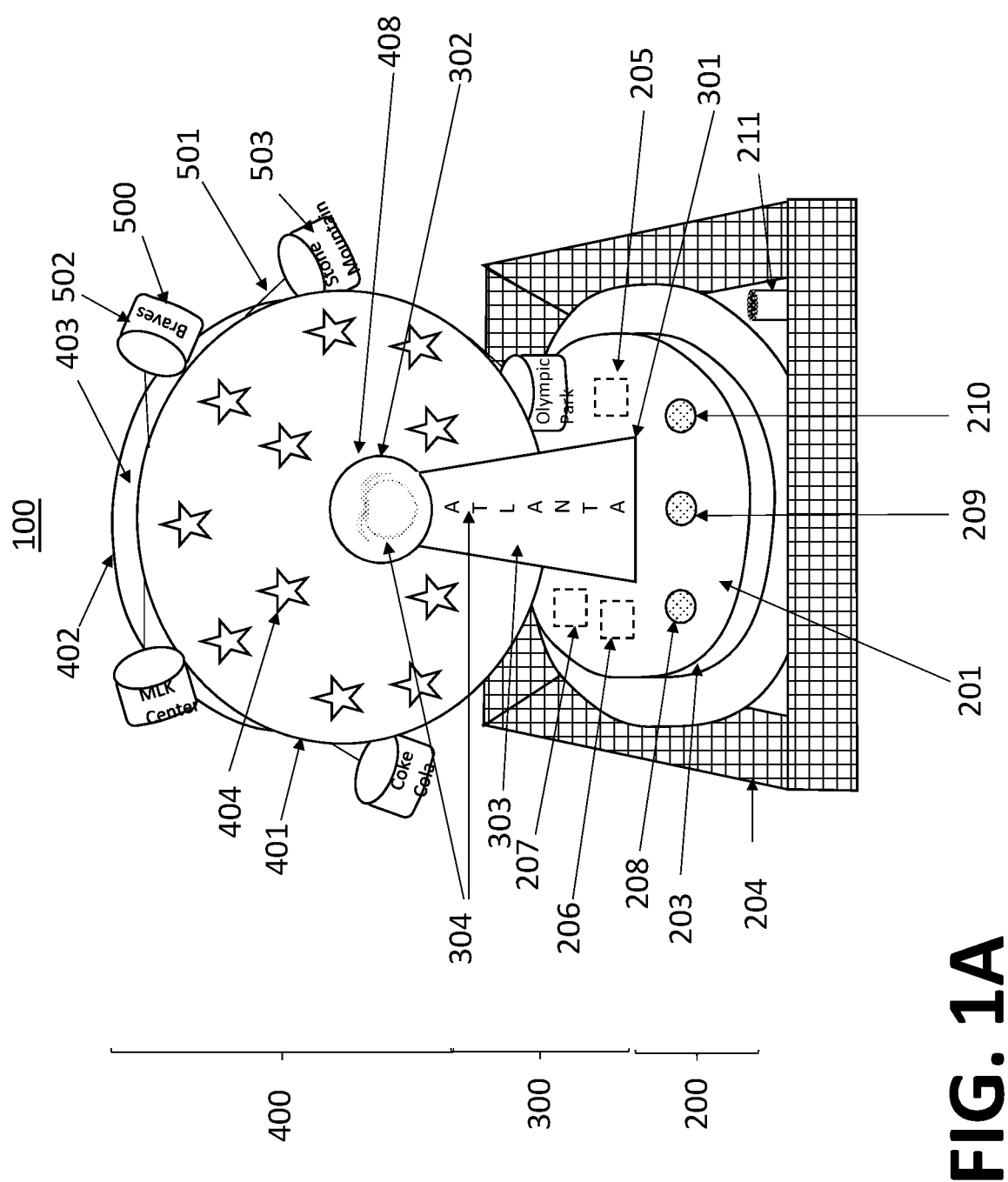
FIG. 1A is an illustrated front view of an exemplary souvenir.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1B:
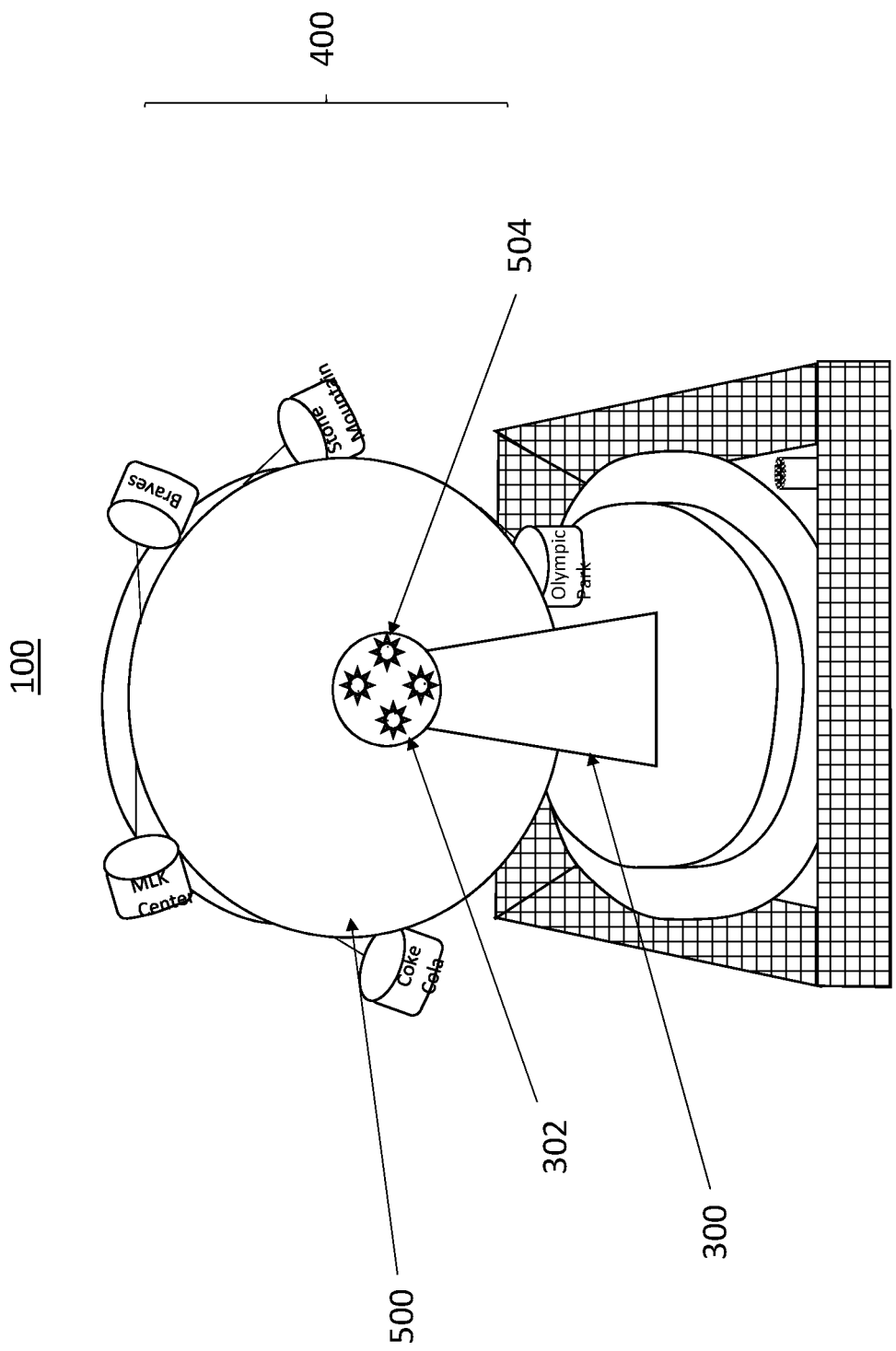
FIG. 1B is an illustrated back view of the exemplary souvenir shown in FIG. 1A.

Referring to FIG. 1A and FIG. 1B, an illustrated view of an exemplary souvenir 100 for displaying high-lights or historical information to others is presented. The souvenir 100 is useful for providing a fun, exciting and cheery presence to a room or house by recalling and reminisce about a wonderful experience. Also, the souvenir 100 is useful providing and sharing the world, an abbreviated history of great cities such as Atlanta, New York City, New Orleans, Chicago, etc.

The souvenir 100 is preferably seven (7) inches in height, however other heights are hereby contemplated, including, but not limited to, six (6) inches, nine (9) inches, etc. The souvenir 100 is preferably four and one-half (4.5) inches in width, however other widths are hereby contemplated, including, but not limited to, four (4) inches, five (5) inches, etc. The souvenir 100 is preferably a Ferris wheel shape.

The souvenir 100 has a base 200, a connecting device 300, a wheel 400 and a plurality of ornaments 500.

The base 200 has a top 201, a bottom 204 and an inside 203. The base 200 is preferably made of a metal material, such as aluminum, steel, etc., however other materials are hereby contemplated, including, but not limited to, polyvinyl chloride (PVC), plastic, etc.

The inside 203 of the bottom 204 of the base 200 has a computing device 205, memory device 206 and a power source 207. The power source 207 is preferably a rechargeable battery, however other sources of power are hereby contemplated, including, but not limited to, disposable batteries, solar, ac/dc, Nicad, etc.

The computing device 205 is electrically coupled to the power source 207. The computing device 205 controls functionality of the souvenir 100. The computing device 205 has programming and devices to execute and send commands to other parts of the souvenir as will be described later.

The memory device 206 is communicatively coupled to the computing device 205. The memory device 206 is useful for storing data such as music, status, etc. The memory device 206 is further electrically coupled to the power source 207.

A first control 208 is coupled to the top 201 of the base 200. The first control 208 is further communicatively coupled to the computing device 205. The first control 208 controls one of: lights, music, motion. The first control 208 is preferably a button, however other types of controls are hereby contemplated, including, but not limited to, toggle switch, touchscreen, etc.

A second control 209 is coupled to the top 201 of the base 200. The second control 209 is further communicatively coupled to the computing device 205. The second control 209 controls one of: lights, music, motion. The second control 209 is preferably a button, however other types of controls are hereby contemplated, including, but not limited to, toggle switch, touchscreen, etc.

A third control 210 is coupled to the top 201 of the base 200. The third control 210 is further communicatively coupled to the computing device 205. The third control 210 controls one of: lights, music, motion. The third control 210 is preferably a button, however other types of controls are hereby contemplated, including, but not limited to, toggle switch, touchscreen, etc.

A speaker 211 is communicative coupled to the computing device 205 of the base 200 and electrically coupled to the power source 207 of the base 200. The speaker 211 receives signals from the computing device 205 to play music retrieved from the memory device 206 when one of the first control 208, second control 209 or third control 210 is actuated. The music played has a significance with the location or event represented by the souvenir 100. The music may include Georgia On My Mind, We Shall Overcome, Take Me Out to the Ball Game, The Midnight Train to Georgia, Lift Every Voice and Sing, National Anthem, etc.

The wheel 400 has a first side 401, a second side 402 and a groove 403. The wheel 200 is electrically coupled to the computing device 205 and electrically coupled to the power source 207.

The first side 401 is securely and movably coupled to the second side 402 at substantially the middle 408 of the first side 401 thereby forming the groove 403 between the first side 401 and the second side 403.

Each of the plurality of ornaments 500 are movably coupled to the groove 403 of the wheel 400 by a coupling device 501. The coupling device 501 is preferably a wire, however other types of coupling devices are hereby contemplated, including, but not limited to, hook, clip, clamp, etc. The plurality of ornaments 500 are preferably a bucket shape, however other shapes are hereby contemplated, including, but not limited to, star, box, etc.

The plurality of ornaments 500 has a front 502. The front 502 of each of the plurality of ornaments 500. An item 503 is coupled to the front 502 of each of the ornaments 500. The items 503 are preferably of a historical significance, however other items are hereby contemplated, including, but not limited to, important locations, symbols, etc.

A plurality of ornamentations 404 are coupled to the first side 401 of the wheel 400. The plurality of ornamentations 404 are preferably star symbols, however other symbols are hereby contemplated, including, but not limited to, historical symbols, important location symbols, etc.

The base 200 is securely coupled to the wheel 400 by the connecting device 300. The connecting device 300 has a first end 301, a second end 302 and a facing 303. The connecting device 300 is preferably made of a metal material, such as aluminum, steel, etc., however other materials are hereby contemplated, including, but not limited to, PVC, plastic, etc.

The first end 301 of the connecting device 301 is securely coupled to the top 201 of the base 200. The second end 302 of the connecting device 300 is coupled to the wheel 200.

Optionally and/or additionally, the face 303 of the connecting device 300 may have an indicator 304. Further, the indicator 304 may be also coupled to the second end 302 of the connecting device 300. The indicator 304 is preferably the name of the city represented, however other indicators are hereby contemplated, including, but not limited to, symbol, painting, etc.

In FIG. 1B, an illustrated back 600 view of the souvenir 100 is shown.

A plurality of lamps 604 are coupled to the second end 302 of the connecting device 300 of the back 500 of the souvenir 100. The plurality of lamps 504 are preferably light-emitting diode (LED) lamps, however other lamps are hereby contemplated, including, but not limited to, liquid crystal display, fluorescent, etc. The lamps 504 are further electrically coupled to the power source 207 and further, still, communicatively coupled to the computing device 205. When one of the first control 208, second control 209 or the third control 210, as assigned, is actuated, the lamps 504 are lit and may be blinking lamps.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A souvenir for displaying high-lights or historical information to others, the souvenir comprising:
 a base, the base having a top and an inside, wherein the inside has a computing device, a memory device and a power source, wherein the computing device electrically coupled to the power source, wherein the computing device communicatively coupled to the memory device, and wherein the memory device electrically coupled to the power source;
 an elongate arm, said elongate arm extending from said upper end of said elongate body;

a wheel, the wheel having a first side, a second side and a groove, wherein the groove being formed between the first side and the second side, and wherein the wheel being coupled to the base by a connecting device;

a plurality of ornaments, each of the ornaments having a face, wherein an indicator being coupled to the face;

a plurality of lamps, the plurality of lamps being coupled to a second end of the connecting device on a back of the souvenir, wherein the lamps being coupled to the computing device, and wherein the lamps being coupled to the power source;

a first control, a second control, a third control, each of the first control, second control and third control be communicatively coupled to the computing device, wherein the first control being configured to indicate: motion, lights, or sound, wherein the second control being configured to indicate: motion, lights, or sound, and wherein the third control being configured to indicate: motion, lights, or sound; and a speaker coupled to the bottom of the base, wherein the speaker being electrically coupled to the power source, wherein the speaker being communicatively coupled to the computing device, wherein the computing device retrieving music from the memory device and wherein the computing device sending the music to the speaker.

2. The souvenir of claim 1, wherein the souvenir being a Ferris wheel.

3. The souvenir of claim 1, wherein the souvenir having a height being seven (7) inches.

4. The souvenir of claim 1, wherein the souvenir having a width being four and one-half (4.5) inches.

5. The souvenir of claim 1, wherein the base being made of a metal material.

6. The souvenir of claim 1, wherein the power source being a rechargeable battery.

7. The souvenir of claim 1, wherein the memory device being for storing music.

8. The souvenir of claim 1, wherein the first control being a button.

9. The souvenir of claim 1, wherein the second control being a button.

10. The souvenir of claim 1, wherein the third control being a button.

11. The souvenir of claim 1, wherein the lamps being light emitting diode (LED) lamps.

12. The souvenir of claim 1, wherein one or more of the ornaments being a bucket.

13. The souvenir of claim 1, wherein the face of each of the ornaments having an item.

14. The souvenir of claim 1, wherein the connecting device further comprising:

an indicator coupled to the face of the connecting device.

* * * * *